United States Patent
Benderly et al.

(10) Patent No.: US 6,706,093 B2
(45) Date of Patent: Mar. 16, 2004

(54) METHOD AND APPARATUS FOR PREVENTING IRON CONTAMINATION IN CORROSIVE SERVICE

(75) Inventors: Abraham Benderly, Houston, TX (US); Michael Stanley DeCourcy, Houston, TX (US); Ronald Eugene Myers, Houston, TX (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/847,126

(22) Filed: May 2, 2001

(65) Prior Publication Data

US 2002/0124728 A1 Sep. 12, 2002

Related U.S. Application Data

(60) Provisional application No. 60/206,367, filed on May 23, 2000.

(51) Int. Cl.$^7$ ................................................ B01D 53/14
(52) U.S. Cl. .......................................... 95/232; 423/237
(58) Field of Search .................... 95/159, 165, 166, 95/178, 179, 187, 191, 193, 194, 232; 423/237

(56) References Cited

U.S. PATENT DOCUMENTS

| | | | |
|---|---|---|---|
| 1,934,838 A | | 11/1933 | Andrussow |
| 2,797,148 A | | 6/1957 | Carlson |
| 2,950,173 A | * | 8/1960 | Baroni et al. |
| 3,335,071 A | * | 8/1967 | Bollen et al. |
| 3,354,615 A | * | 11/1967 | Guadalupi |
| 3,455,659 A | | 7/1969 | Longfield et al. |
| 3,691,729 A | * | 9/1972 | De Rooy et al. |
| 4,013,431 A | * | 3/1977 | Berkel et al. |
| 4,054,431 A | * | 10/1977 | Kotcharian |

(List continued on next page.)

FOREIGN PATENT DOCUMENTS

| | | |
|---|---|---|
| EP | 0 088 478 A | 9/1983 |
| EP | 0 544 056 A | 6/1993 |
| EP | 0 572 778 A2 | 12/1993 |
| EP | 0 640 368 A | 3/1995 |
| EP | 0 962 425 A1 | 12/1999 |
| EP | 1 065 168 A1 | 1/2001 |
| GB | 1 192 044 A | 5/1970 |

OTHER PUBLICATIONS

XP–002237811—Abstract, Chemical Abstracts Service, Columbus, Ohio, US, Database accession No. 83:62542 CA (1973).
XP–002237809—Abstract, Chemie–Ingenieur–Technik, vol. 42, No. 8, 1970, pp. 521–523.
XP002237810—Avesta Sheffield product specifications 724L and 725LN (printed 1999).
XP–002225239—Abstract, Derwent Publications Ltd, London GB, AN 1996–283197, May 14, 1996.
XP002225240—Abstract, Derwent Publications Ltd, London GB, AN 1992–062867, May 23, 1991.
XP002225238—Abstract, Chemical Abstracts Service, Columbus, Ohio, US, Database accession No. 99:55525 CA, (1983).
XP002067880—Abstract, STN Chemical Abstracts, XX, XX, vol. 4, No. 105, Jul. 28, 1986.

*Primary Examiner*—Duane S. Smith

(57) ABSTRACT

A method which reduces iron contamination of a system which receives ammonia from an ammonia recovery process by one or more of the following techniques:
 a) Physically separating iron oxide, iron containing colloidal particles, and liquid droplets from the gas stream;
 b) Preventing AC from depositing on piping via elimination of condensation, thereby preventing corrosion of the piping; or
 c) Installing piping and equipment that is not susceptible to corrosive attack by AC, thereby eliminating the source of iron contamination.

23 Claims, 2 Drawing Sheets

U.S. PATENT DOCUMENTS 4,060,591 A * 11/1977 Garber et al.
4,120,667 A * 10/1978 Gettert et al.
4,251,235 A * 2/1981 Biermans
4,256,471 A * 3/1981 Goorden
5,230,877 A * 7/1993 Eimer et al.
5,427,759 A 6/1995 Heitmann
6,001,223 A 12/1999 Hoffman et al.
2002/0124728 A1 * 9/2002 Benderly et al.

* cited by examiner

METHOD AND APPARATUS FOR PREVENTING IRON CONTAMINATION IN CORROSIVE SERVICE

CROSS REFERENCE TO RELATED PATENT APPLICATIONS

This is a non-provisional application of prior pending U.S. provisional application Ser. No. 60/206,367 filed May 23, 2000.

FIELD OF THE INVENTION

This invention relates to processes that generate a gas stream comprising ammonia ($NH_3$) and carbon dioxide ($CO_2$). In particular, the invention relates to a method for reducing undesirable side products that form when ammonia is removed and recovered from the gas stream.

BACKGROUND OF THE INVENTION

An example of a process that generates such a gas stream is the Andrussow method for preparing hydrogen cyanide (see U.S. Pat. No. 1,934,838), ammonia, an oxygen-containing gas such as air, and hydrocarbon gases such as methane are fed to a reaction system at ambient or elevated temperature. The reactants are then reacted in the presence of a platinum-containing catalyst at temperatures of 1000° C. to 1400° C. to produce hydrogen cyanide. A portion of the hydrocarbon/ammonia reactant feed gas is combusted to provide the energy required to maintain the highly endothermic cyanide formation reaction.

One problem associated with the Andrussow process is that there is a high level of residual ammonia in the exit gas. The residual ammonia must be removed from the HCN product stream to avoid polymerization of HCN. Although low levels of ammonia in the exit gas may be neutralized with acid in a purification process, the ammonia concentration in the exit gas of the Andrussow process is too high for the HCN product stream to be sent directly to such a neutralization process. Therefore, the exit gas containing residual ammonia must first be sent to a separate process for removing the majority of the ammonia and then the product stream sent to a purification process.

Ammonia can be removed from a gas stream by contacting the stream with a mineral acid complex, derived from acids such as nitric, phosphoric, or boric to chemically capture the ammonia. The aqueous ammonia/acid complex is then thermally decomposed to free the ammonia, which can be recovered for use in a downstream process (see U.S. Pat. No. 2,797,148 for example).

Another problem in downstream processes, such as Andurssow HCN processes, is that they are susceptible to contaminants produced during the operation of the ammonia recovery process. A contaminant that is of particular concern is iron oxide, an abrasive material that causes premature wear on equipment and may also lower downstream-process catalyst efficiency. The present invention is a series of preventive steps which alleviate iron oxide contamination of processes downstream of ammonia recovery processes.

SUMMARY OF THE INVENTION

The applicants have discovered that it is possible to significantly reduce iron oxide contamination in an ammonia recovery process by preventing ammonium carbamate from depositing on the inside walls of piping and associated equipment within the ammonia recovery process and by using piping and equipment materials that are not susceptible to corrosion by ammonium carbamate. One aspect of the invention is a method for reducing iron oxide contamination of the downstream process by physically removing iron oxide and iron oxide precursor compounds from the process stream. In a further aspect of the invention, the pipes and equipment carrying recovered ammonia from an ammonia recovery process are heated to prevent ammonium carbamate from depositing on the inside walls of the pipes and equipment. In a still further aspect of the invention, the process piping and associated equipment carrying recovered ammonia from an ammonia recovery process is constructed from a material that is not susceptible to corrosion by ammonium carbamate.

Figure 1:
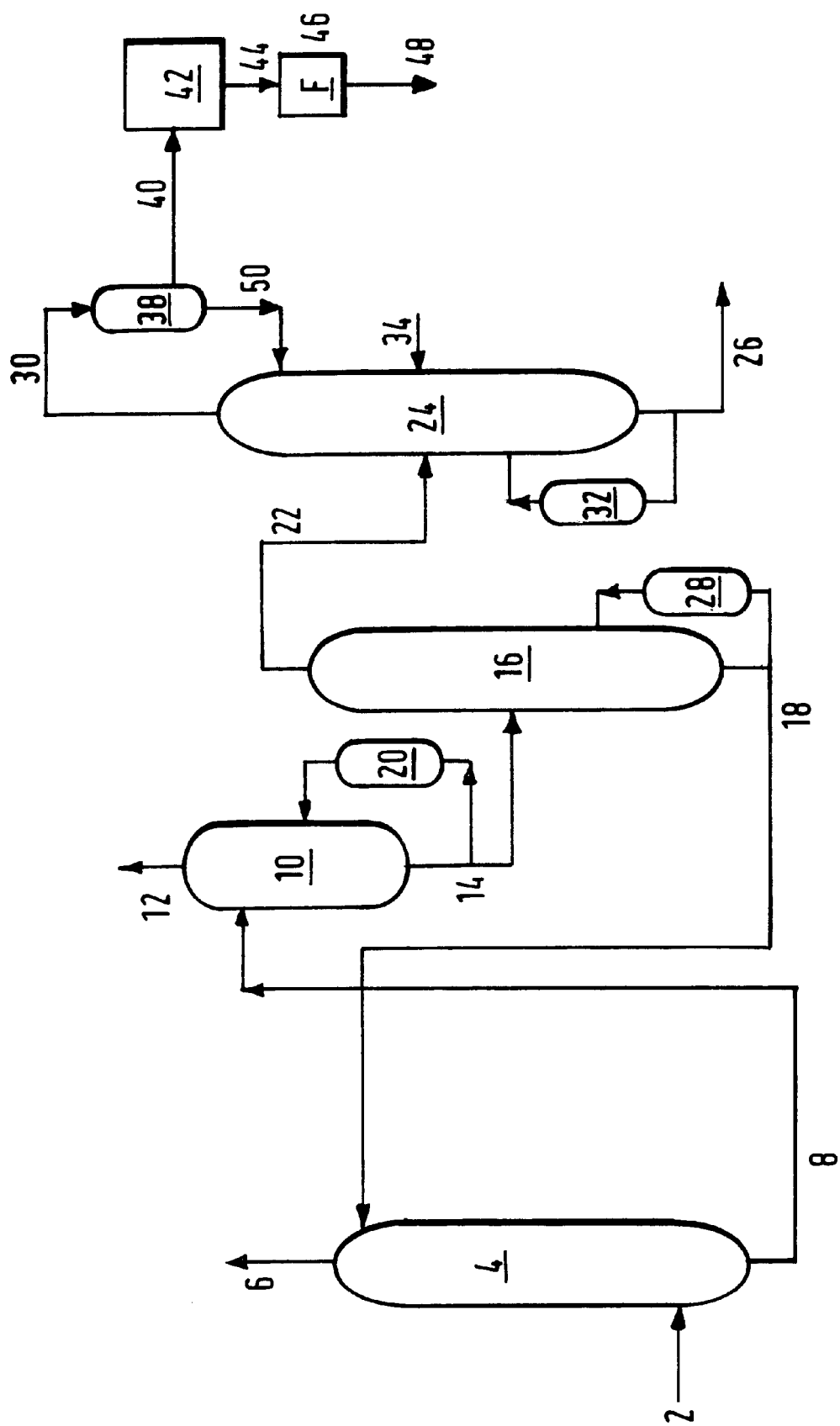
FIG. 1 depicts a simplified flow diagram of an embodiment of the present invention.

While the invention is susceptible to various modifications and alternative forms, specific embodiments thereof have been shown by way of example in the drawing and are herein described in detail. Those skilled in the art will appreciate, however, that these Figures are schematic only and that they omit process details that are not particularly relevant to the present invention. It should be further understood that the description herein of specific embodiments is not intended to limit the invention to the particular forms disclosed; but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Iron oxide contamination has been observed in process systems downstream from the ammonia recovery process even in systems that incorporate preventive measures such as using raw material feed gases that are free of iron contamination and using filters at the downstream process inputs to remove any particulate iron species. This suggests that contaminants such as iron oxide can be present in the recycled ammonia from the ammonia recovery process and further that such contaminants may be present in forms that are not readily removed by standard particulate filtration. The chemical steps leading to iron oxide contamination from an ammonia recovery process have been deduced and are shown below.

Ammonia reacts with carbon dioxide to yield ammonium carbamate (AC, eq. 1).

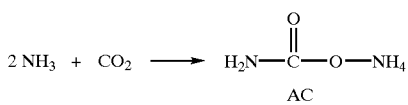

$$2 NH_3 + CO_2 \longrightarrow H_2N-\overset{\overset{O}{\|}}{C}-O-NH_4 \quad (1)$$
$$AC$$

AC can dissolve into liquid that condenses on the inside wall of process piping and equipment where it can react with the iron in carbon steel to produce iron oxide (Eq. 2). Iron oxide is abrasive and is particularly damaging to rotating equipment, such as ammonia compression equipment. It is also a poison to many catalysts, such as the Platinum-containing catalysts used in HCN processes. In many applications, particulate filters can be installed to trap iron oxide. However, it has been discovered that if cyanide is also present in the gas stream, iron oxide will react with cyanide to yield iron hexacyano complexes (IHC) that exist as colloidal suspensions of the corresponding ammonium salts (Eq. 3). Such colloidal suspensions are not removed by particulate filtration and are passed to downstream processes where the iron hexacyano complexes can be converted back into iron oxide by reaction with oxygen in the presence of heat (Eq. 4). These problems are minimized in the present invention by removing IHC from the process stream, by preventing condensation on the walls of the piping which will dissolve AC from the gas stream, and by using equipment and piping that is constructed of material that is not susceptible to corrosion by AC.

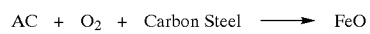

$$AC + O_2 + \text{Carbon Steel} \longrightarrow FeO \quad (2)$$

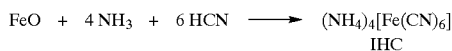

$$FeO + 4 NH_3 + 6 HCN \longrightarrow (NH_4)_4[Fe(CN)_6] \quad (3)$$
$$IHC$$

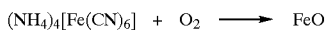

$$(NH_4)_4[Fe(CN)_6] + O_2 \longrightarrow FeO \quad (4)$$

Referring to the drawing, 2 designates the feed gas comprising ammonia, $CO_2$, and possibly other gases such as hydrogen cyanide, acrylonitrile, nitrogen, water vapor, methane, or combustion by-products such as CO. The feed gas is contacted with an ammonia-capture solution in capture column 4.

Ammonia-free gas is withdrawn from column 4 via line 6. The term "ammonia-free gas" as used herein refers to gas that has 75% lower ammonia concentration than the feed gas. More preferably, the concentration of ammonia in the gas exiting via line 6 is reduced by 90%. Most preferably, the concentration of ammonia in the gas exiting via line 6 is reduced by more than 99%.

Capture solution at the bottom of the capture column, which is enriched with ammonia, and also contains absorbed CO2 and possibly other absorbed gases such as hydrogen cyanide, acrylonitrile, nitrogen, water vapor, methane, or combustion by-products such as CO is routed to stripper 10 via line 8, where it is heated via reboiler 20, to remove impurities, which are vented via line 12. Ammonia enriched solution exits stripper 10 via line 14 and is routed to ammonia stripping column 16 where the solution is heated via reboiler 28 to release ammonia from the solution. The capture solution, now lean in ammonia, is routed back to capture column 4 via line 18.

The gas exiting ammonia stripper 16 via line 22 consists essentially of ammonia and water vapor, but may also contain $CO_2$. The stream may be fed as a gas, or alternatively may be condensed prior to feeding, into ammonia distillation column 24 where the ammonia is separated from the water by heating via reboiler 32. Water is withdrawn via line 26 and treated as waste-water. In an alternative embodiment, ammonia stripper 16 and ammonia distillation column 24 are combined into one column, eliminating the need for reboiler 32 and line 22.

A gas stream of purified ammonia exits the distillation column 24 via line 30 and is routed to separator 38. The term 'gas stream of purified ammonia' as used herein refers to a gas stream comprising at least about 75% ammonia. As shown in FIG. 1, separator 38 condenses a portion of the gas stream and the condensate is refluxed via line 50 back into distillation column 24. When the gas exiting from ammonia distillation column 24 is condensed, a portion of any AC present will dissolve into the condensate and will be returned to the distillation column via line 50, where it can accumulate. In one embodiment of the present invention, caustic material is added to ammonia distillation column 24 via line 34 to convert the AC to an insoluble carbonate. Suitable caustic materials include NaOH, KOH, MgOH, CaOH and the like, as well as mixtures thereof. In another embodiment, caustic material is added directly (not shown) into line 50.

Additionally, if condensation occurs on the inside wall of line 30, the dissolved AC can corrosively attack the piping material. In one embodiment of the present invention, the temperature of line 30 is maintained high enough to prevent condensation on the inside of the line. The temperature of the line may be maintained by heating the line with steam or electrical tracing or by jacketing. Insulation may also be present. In one embodiment of the present invention, the temperature of the line is maintained above the condensation temperature of the gas and below about 350° C. More preferably, the temperature of the line is maintained in the range from about 70° C. to about 200° C.

In still another embodiment of the present invention, line 30 is constructed of a material that is not susceptible to corrosion by AC. In one embodiment of the present invention, line 30 is constructed from a metal that has a lower iron content than carbon steel. Preferred materials include stainless steel, L series stainless steel, Duplex 2205, Hastelloys, Inconels, and Zirconium. In one embodiment of the present invention, line 30 is constructed from Type 316L stainless steel. In an alternative embodiment of the present invention, the inside wall of line 30 is lined with a non-metallic such as TEFLON®, from DuPont Fluoroproducts, Wilmington, Del., or glass. It is further contemplated that in some situations it may be advantageous to construct line 30 and separator 38 from different corrosion-resistant materials, and further that equipment, such as the separator itself, may employ more than one material of construction—for example, in the case where separator 38 comprises a condenser, the condenser tubesheet may be lined/clad with a non-metallic material such as glass or resin and the tubes may be of unlined metal.

Gas exits separator 38 via line 40 for transfer to a downstream process. In one embodiment of the present invention, gas exiting separator 38 via line 40 is transferred to optional compressor 42. In one embodiment of the present invention, compressor 42 is constructed from materials that are resistant to corrosion by AC. Suitable materials are as listed above. In an especially preferred embodiment, the compressor is operated at an elevated temperature, such that the gas is discharged at a temperature between about 80° C. and 350° C. In an alternative embodiment of the present invention, optional compressor 42 is absent and lines 40 and 44 are contiguous.

In one aspect of the present invention, lines 40 and 44 are constructed of a material that is not susceptible to corrosion by AC. Suitable material are as listed above. In one embodiment of the present invention, lines 40 and 44 are constructed from 316L stainless. In an alternative embodiment of the present invention, the inside walls of lines 40 and 44 are lined with a non-metal material, preferably TEFLON®, from DuPont Fluoroproducts, Wilmington, Del., or glass.

In another embodiment of the present invention, the temperature of the gas inside lines 40 and 44 is maintained high enough to prevent condensation in these lines or in related equipment. In one embodiment of the present invention, lines 40 and 44 as well as any intervening equipment are heated with steam or electrical tracing to prevent condensation on the inside of the lines. Alternatively, lines 40 and 44 and any intervening equipment are heated with jacketing. Insulation may also be present. In these embodiments, the lines and equipment are maintained above the condensation temperature of the gas and below about 350° C., more preferably between 70° C. and 200° C.

In another embodiment of the present invention, the gas in lines 40 and 44 is passed through at least one heat exchanger to elevate and maintain the temperature of the gas above its condensation temperature and below about 350° C. More preferably, the temperature of the gas is maintained in the range from about 70° C. to about 200° C.

Condensation can also be minimized by operating distillation column 24 such that the concentration of water in the purified gas stream exiting the column via line 30 is minimized. The concentration of ammonia in the gas stream exiting column 24 is preferably greater than 75%, more preferably greater than 90%, and most preferably greater than 95%.

Figure 2:
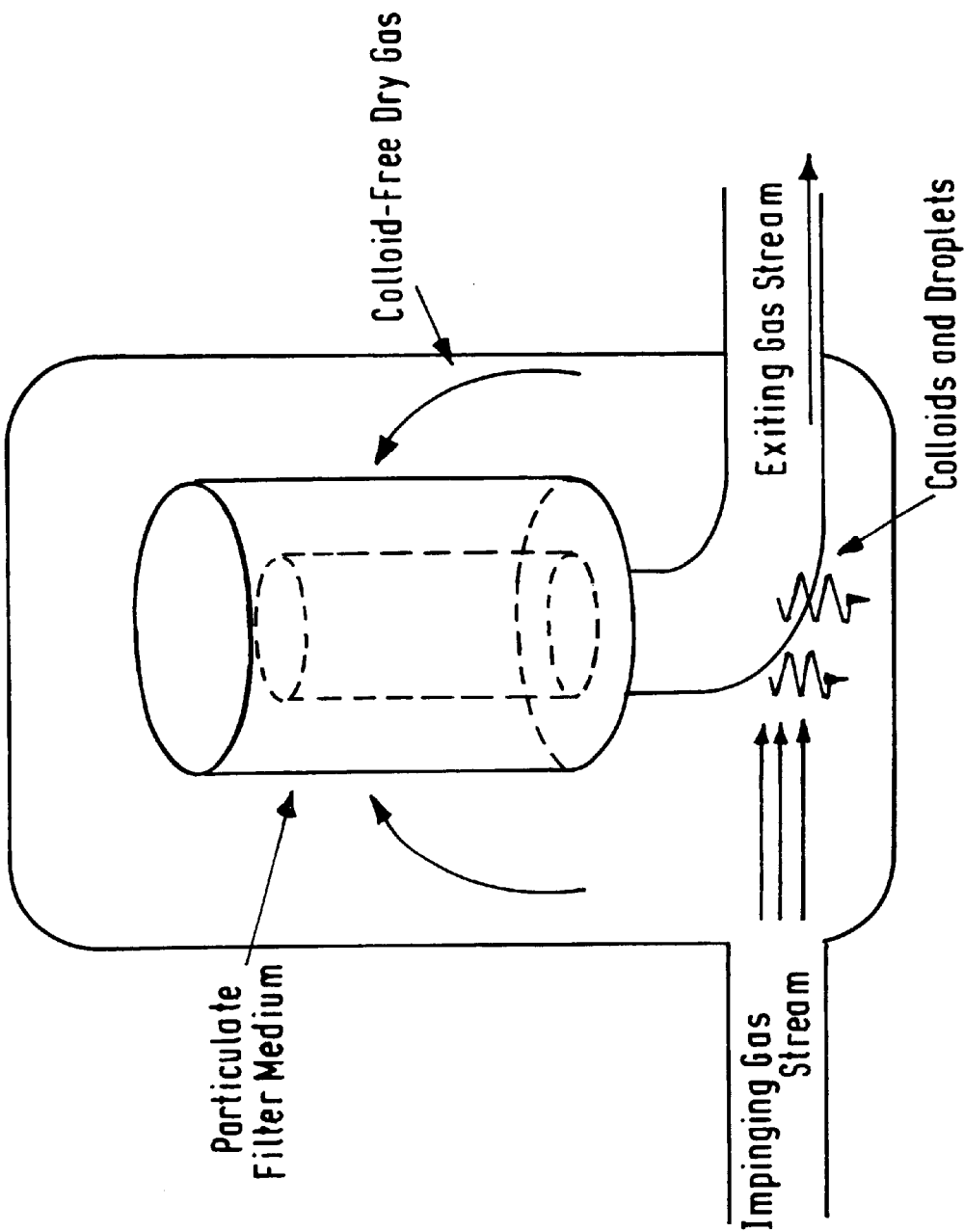
FIG. 2 depicts a simplified drawing of an embodiment of an apparatus for separating liquids, colloids and particulates from a gas stream.

In another embodiment of the present invention, gas in line 44 passes to rezone 46 where impurities are removed from the gas stream to produce a purified gas stream 48. The zone comprises a first component that separates colloidal particles and liquid droplets from the gas stream and a second component that separates particulate matter from the gas stream. In one embodiment of the present invention, the two components are combined into one apparatus. Referring to FIG. 2, in one embodiment of the present invention, the gas in line 44 is directed into a chamber, wherein a vector change in the gas stream causes the colloidal material and liquid droplets entrained in the gas to impact internal structures, such as baffles, impingement plates, and (as shown here) the piping elbow, as well as the sides of the chamber. The colloid- and liquid-free gas then passes through particulate filtering media which is off the line of the impinging gas stream before exiting the chamber. In an alternative embodiment of the present invention, the zone in which impurities are separated from the gas stream may comprise one or more cyclones or impingement separators to physically remove droplets and colloidal materials from the gas stream followed by one or more filters to remove particulates from the gas stream.

In summary, the present invention is a method which reduces iron contamination of a system which receives ammonia from an ammonia recovery process by one or more of the following techniques:

1. Physically separating iron oxide, iron containing colloidal particles, and liquid droplets from the gas stream;
2. Preventing AC from depositing on piping via elimination of condensation, thereby preventing corrosion of the piping; or
3. Installing piping and equipment that is not susceptible to corrosive attack by AC, thereby eliminating the source of iron contamination.

It will further be understood that numerous alternative embodiments and variations of the methods disclosed herein are possible without departing from the scope of the appended claims.

What is claimed is:

1. A method for reducing contamination downstream of a process for recovering ammonia, said ammonia recovery process including the steps of:
   a) providing a gas stream comprising ammonia and $CO_2$;
   b) capturing ammonia from said gas stream;
   c) purifying the captured ammonia; and
   d) delivering a gas stream of purified ammonia to a downstream process through ammonia removal piping having an inside wall;

wherein said method for reducing contamination in the downstream process comprises one or more steps selected from the group consisting of:

separating liquid droplets, colloidal particles, and particulate solids from the purified ammonia gas stream exiting the distillation column;

heating the lines and any intervening equipment above the condensation temperature of the gas;

minimizing the water content of the purified (recycle) ammonia stream;

heating the temperature of the gas within said ammonia removal piping and any intervening equipment above the condensation temperature of the gas; and fabricating at least the inside wall of said ammonia removal piping and any intervening equipment from a material that is not susceptible to corrosion by ammonium carbamate.

2. A method according to claim 1 wherein said lines and equipment are maintained above about 70 C. and below about 350 C.

3. A method according to claim 1 wherein said lines and equipment are maintained above about 70 C and below about 200 C.

4. A method according to claim 1, comprising maintaining the temperature of said gas inside said ammonia removal piping and intervening equipment above about 100° C. and below about 300° C.

5. A method according to claim 1 wherein said gas inside said ammonia removal piping and intervening equipment is maintained above 100° C. and below about 175° C.

6. A method according to claim 1 wherein the purified recycle ammonia concentration is at least 75%.

7. A method according to claim 1 wherein the purified recycle ammonia concentration is at least 93%.

8. A method according to claim 1 wherein the purified recycle ammonia concentration is at least 95%.

9. A method according to claim 1, further comprising adding a caustic material to the purification step.

10. A method according to claim 1 wherein at least the inside wall of the ammonia removal piping and any intervening equipment is made of a material that is not susceptible to corrosion by ammonium carbamate.

11. A method according to claim 10 wherein said piping and intervening equipment is made of a material selected from the group consisting of 316 stainless steel, 316L stainless steel, 304 stainless steel, 304L stainless steel, Hastelloys, Inconels, and Zirconium.

12. A method according to claim 10 wherein said piping and intervening equipment material is stainless steel.

13. A method according to claim 12 wherein said piping and intervening equipment material is L series stainless steel.

14. A method according to claim 13 wherein said piping and intervening equipment material is Type 316L stainless steel.

15. A method according to claim 10 wherein the ammonia removal piping and intervening equipment comprises an inner lining made of a material not susceptible to corrosion by ammonium carbamate.

16. A method according to claim 15 wherein said lining material is a fluoropolymer.

17. A method according to claim 15 wherein said lining material is glass.

18. A method according to claim 1 wherein liquid droplets, colloidal particles, and particulate solids are separated from the purified ammonia gas stream exiting the distillation column.

19. A method according to claim 18 wherein liquid droplets, colloidal particles, and particulate solids are separated from the purified ammonia gas stream exiting the ammonia distillation column by directing the gas stream through a first component that physically removes liquid droplets and colloidal particles and a second component that removes particulate solid from the gas stream.

20. A method according to claim 19 wherein said first component and said second component are combined in a single apparatus.

21. A method according to claim 20 wherein said apparatus comprises a chamber wherein, when said purified ammonia gas stream enters the chamber a vector change in the gas stream causes the colloidal material and liquid droplets entrained in the gas to impact internal structures and the walls of the chamber, and wherein the gas then passes through a particulate filtering medium which is off the line of the impinging gas stream before exiting the chamber.

22. A method according to claim 19 wherein said first component is one or more apparatus selected from the group consisting of impingement separators and cyclones.

23. A method according to claim 19 wherein said second component comprises one or more filters.

* * * * *